(12) United States Patent
Song et al.

(10) Patent No.: US 7,254,332 B2
(45) Date of Patent: Aug. 7, 2007

(54) WAVELENGTH DIVISION MULTIPLEXING PASSIVE OPTICAL NETWORK SYSTEM

(75) Inventors: Jae-Won Song, Daegu (KR); Jong-Hoon Lee, Daegu (KR); No-Wook Park, Daegu (KR); Jun-Hyok Seo, Daegu (KR); Man-Shik Jeon, Daegu (KR); Suck-Woo Jang, Youngcheon-Si (KR); Jang-Ki Baek, Pohang-Si (KR)

(73) Assignee: Jun-Kook Choi (KR)

( * ) Notice: Subject to any disclaimer, the term of this patent is extended or adjusted under 35 U.S.C. 154(b) by 720 days.

(21) Appl. No.: 10/634,509

(22) Filed: Aug. 5, 2003

(65) Prior Publication Data

US 2004/0033076 A1 Feb. 19, 2004

(30) Foreign Application Priority Data

Aug. 6, 2002 (KR) .................. 10-2002-0046314
Dec. 3, 2002 (KR) .................. 10-2002-0076169
Dec. 3, 2002 (KR) .................. 10-2002-0076191

(51) Int. Cl.
*H04J 14/02* (2006.01)

(52) U.S. Cl. ................... 398/72; 398/68; 398/168

(58) Field of Classification Search ........... 398/68–72, 398/168
See application file for complete search history.

(56) References Cited

U.S. PATENT DOCUMENTS 4,491,983 A * 1/1985 Pinnow et al. ................. 398/67

2003/0142978 A1 * 7/2003 Lee et al. ..................... 398/34

FOREIGN PATENT DOCUMENTS

WO      WO 03/063401        * 7/2003

OTHER PUBLICATIONS

"A Novel Bi-Directional Add/Drop Module for Single Fiber Bi-Directional Self-Healing Wavelength Division Multiplexed Ring Networks"; Authors: Y. Zhao, X.J. Zhao, J.H. Chen, F.S. Choa and Y.J. Chen; Department of Computer Science and Electrical Engineering; pp. 183-185, 1999.

(Continued)

*Primary Examiner*—Leslie Pascal
(74) *Attorney, Agent, or Firm*—Cantor Colburn LLP (57) ABSTRACT

Disclosed is a wavelength division multiplexing passive optical network (WDM PON) system in which an optical signal outputted from a central office is injected into a Fabry-Perot laser diode (F-P LD) as the light source of an optical network unit, so that the output wavelength of the optical network unit is injection-locked at the same wavelength as that of the optical signal outputted from the central office, thereby enabling the optical network unit to output an optical signal having the same wavelength as that of the optical signal outputted from the central office. In accordance with this system, it is possible to transmit and receive forward and backward data at the same wavelength by the unit of channels. Since inexpensive F-P LDs are used as respective light sources of the central office and optical network units, it is possible to efficiently and economically implement a WDM PON system.

8 Claims, 8 Drawing Sheets

OTHER PUBLICATIONS

"A Low-Cost WDM Source with an ASE Injected Fabry-Perot Semiconductor Laser"; Authors: Hyun Deok Kim, Seung-Goo Kang, and Chang-Hee Lee; IEEE Photonics Technology Letters; vol. 12, No. 8; pp. 1067-1069; Aug. 2000.

"Upstream traffic transmitter using injection-locked Fabry-Perot laser diode as modulator for WDM access networks"; Authors: L.Y. Chan, C.K. Chan, D.T.K. Tong, F. Tong and L.K. Chen; Electronic Letters; vol. 38, No. 1; pp. 43-45; Jan. 3, 2002.

"Bidirectional WDM Self-Healing Ring Network Based on Simple Bidirectional Add/Drop Amplifier Modules"; Authors: C.H. Kim, Chang-Hee Lee, and Y.C. Chung; Korea Advanced Institute of Science and Technology, Department of Electrical Engineering; pp. 180-182, 1998.

\* cited by examiner

WAVELENGTH DIVISION MULTIPLEXING PASSIVE OPTICAL NETWORK SYSTEM

BACKGROUND OF THE INVENTION

1. Field of the Invention

The present invention relates to a wavelength division multiplexing (WDM) passive optical network system, and more particularly to a WDM passive optical network system in which forward and backward channels have the same wavelength.

2. Description of the Related Art

Recently, demand for broadband multimedia services and high-speed and large-capacity Internet services has abruptly increased. In order to provide, to subscribers, such broadband multimedia services and high-speed and large-capacity Internet services, it is necessary to construct a network architecture based on an optical network. Recently, interest in an optical network directly connected to optical network units (ONUs), using optical fibers, has also increased in order to provide broadband services to subscribers.

In order to construct an effective and economical optical network, active research into passive optical networks (PONS) has also recently been conducted. A passive optical network is a system in which a central office (CO), that is, a service provider, and ONUs, that is, service demanders, are connected only by passive optical elements.

In such a PON, typically, the connection between the central office and a remote node installed in an area adjacent to subscribers is achieved using a trunk fiber, whereas the connection between the remote node and each ONU is achieved using a distribution fiber, in order to minimize the total length of optical fibers used in the PON.

Such a PON has various advantages in that it is possible to reduce the initial installation costs while easily carrying out the maintenance and repair of the PON because the total length of optical fibers used in the PON is minimized, and subscribers share passive optical elements. By virtue of such advantages, use of such a PON is greatly increasing. In particular, WDM-PON is being highlighted as a next-generation optical network meeting the information age in future because it can provide a large quantity of information to each subscriber while maintaining a high security and easily achieving an improvement in performance.

Figure 1:
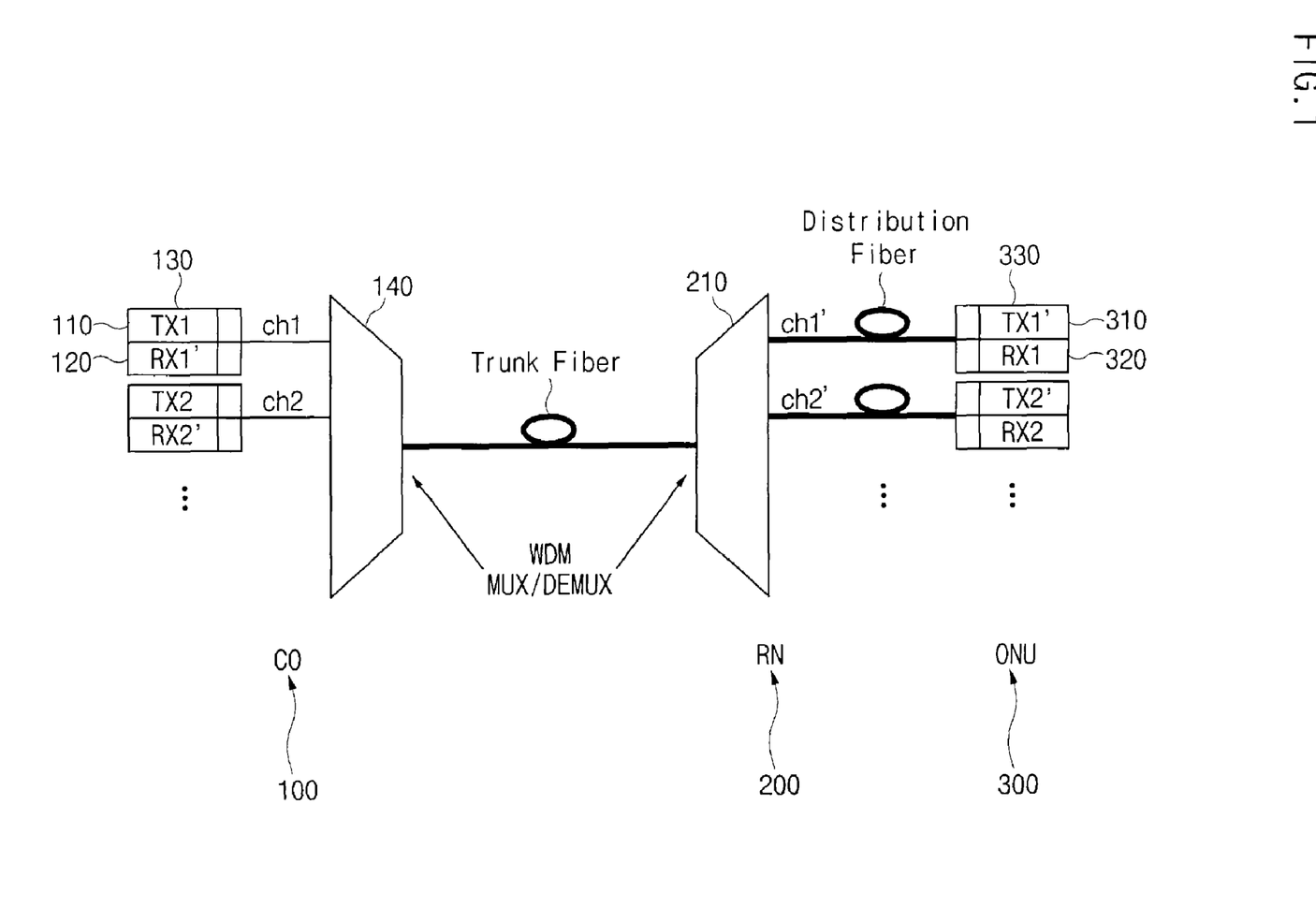
FIG. 1 is a schematic diagram illustrating the configuration of a conventional WDM PON system.

FIG. 1 is a schematic diagram illustrating the configuration of a general WDM PON system.

In the WDM PON shown in FIG. 1, different wavelengths $\lambda_1$ to $\lambda_N$ are assigned to respective ONUs 300 by a central office 100 so that the central office 100 can simultaneously transmit data to the ONUs 300 through a single optical communication line. Respective ONUs 300 can also transmit data, using different wavelengths $\lambda_{N+1}$ to $\lambda_{2N}$ assigned thereto, respectively.

In order to assign different wavelengths to respective subscribers, this WDM PON should be equipped with light sources respectively adapted to provide different wavelengths corresponding to respective assigned wavelengths. In particular, the central office 100 and ONUs 300 should use, as their light sources, expensive light sources such as distributed feedback laser diodes having a very narrow spectrum width, in order to minimize interference between adjacent wavelengths (channels).

Since such a conventional WDM PON uses light sources having a very narrow spectrum width, it is also necessary to use an additional device such as a temperature stabilizer or a current stabilizer, in order to stabilize oscillating wavelengths. Also, such a conventional WDM PON uses forward and backward channels of different wavelengths. For this reason, it is necessary to install multiplexers and demultiplexers for forward and backward optical signals, respectively. As a result, there is a problem of high system construction costs.

In order to solve this problem, research has been conducted into economically constructing a WDM PON using commercially-available, inexpensive optical elements, and there are some associated research reports.

For example, there is a research report entitled "A low cost WDM source with an ASE injected Fabry-Perot semiconductor laser", IEEE Photonics Technology Letter, Vol. 12, no. 11, pp. 1067-1069, 2000. This research report discloses a method for economically implementing an optical network system by using an ASE (Amplified Spontaneous Emission) and an inexpensive Fabry-Perot laser diode (F-P LD) as respective light sources of a central office and each ONU. In accordance with this method, an ASE outputted from the central office is injected into the F-P LD of the ONU to lock the output wavelength of the F-P LD at the same wavelength as that of the ASE (Hereinafter, this operation is referred to as "injection locking".). As a result, the F-P LD can oscillate in a single mode, as a distributed feedback laser diode.

However, this method has a drawback in that the central office should be equipped with a separate light source for generating an ASE.

There is another research report entitled "Upstream traffic transmitter using injection-locked Fabry-Perot as modulator for WDM access networks", Electronics Letters, Vol. 38, No. 1, pp. 43-44, 2002. This research report discloses a method for economically implementing an optical network system using a distributed feedback laser diode (DFB LD) and an F-P LD as respective light sources of a central office and each ONU. In accordance with this method, the ONU receives an optical signal outputted from the DFB LD to use a part of the received optical signal for signal detection while using the remaining part of the received optical signal for injection locking.

However, this method has a drawback in that the DFB LD used as the light source of the central office is expensive. Thus, the above mentioned methods have drawbacks to be solved.

Meanwhile, the physical topology of an optical network is selected from a ring type, a bus type, and a star type, upon designing the optical network in accordance with an application of the optical network. The concept corresponding to the physical topology of an optical network is a logical topology. This logical topology is also selected from a ring type, a bus type, and a star type in accordance the physical and logical connection states of constitutive elements in the optical network. As compared to other types, the ring type topology has been recognized as exhibiting a satisfactory reliability in backbone networks because it can perform a self-healing function even when system switching occurs due to any disaster or accident.

Early developed WDM ring architectures are unidirectional. In order to implement a bi-directional architecture, using such a WDM ring architecture, therefore, it is necessary to use a double fiber. Recently, research on single fiber bi-directional ring networks has been conducted. In accordance with the research, single fiber bi-directional ring networks are implemented using bi-directional add/drop modules (B-ADMs) of a new type (disclosed in, for example, C. H. KIM et al., "Bi-directional WDM Self-Healing Ring Network Based on Simple Bi-directional Add/Drop Amplifier Modules"; and Y. Zhao et al., "A Novel Bi-directional Add/Drop Module for Single Fiber Bi-directional Self-healing Wavelength Division Multiplexed Ring Networks").

That is, conventional systems having a self-healing function use a double fiber ring architecture. When system switching occurs due to fiber switching in such a system, the path defined between nodes at opposite ends of the switched fiber in the system is bypassed over the self-healing fiber by an active element. Thus, the switched system can be self-healed.

However, the above mentioned single fiber bi-directional ring networks using B-ADMs is complex and expensive while having a problem in that new type optical elements should be used. Accordingly, it is necessary to develop a ring type WDM PON system capable of having a self-healing function by use of add/drop elements having the same wavelength for forward and backward optical signals, in place of complex optical elements.

Meanwhile, in the case of a transmission network constructed using a WDM PON system, it is necessary to perform an add/drop function at each node of the transmission network. Add/drop elements typically used in a WDM system to perform such an add/drop function operate to drop a wavelength signal of a particular channel, and then to add, to the channel, another signal having the same wavelength as the dropped wavelength signal. Such an add/drop element is widely used for separation and addition of a particular channel in WDM systems. The add/drop element may be implemented as one of various types, for example, a waveguide type, a micro-optic type using a thin film filter, or a fiber type.

Generally, a multi-layer dielectric filter is used for WDM filters of a micro-optic type. That is, such a micro-optic type WDM filter can pass a signal of a particular band while reflecting a signal of another particular band because it employs a multi-layer thin film structure. Also, this filter basically has reversible operation characteristics.

In conventional WDM systems, the operation principle of the 4-port add/drop device is frequently used to separate an optical signal of a particular wavelength from forward or backward optical signals of different wavelengths traveling through an optical signal, or to add the optical signal to the forward or backward optical signals (here, the reflected optical signal may be used for transmission whereas the transmitted optical signal for reception). Thus, the above mentioned conventional WDM-PON systems use different channel wavelengths for up and down-links. Conventional PON architectures are advantageous in the case in which subscribers are concentrated on one area because they use a star topology. However, these PON architectures exhibit less gain in terms of fiber installation costs in the case in which the distance between subscribers is long.

In other words, the star type distribution PON architecture is an architecture capable of considerably reducing the fiber installation costs, as compared to point-to-point systems, under the condition in which it is assumed that subscribers are distributed in a concentrated state. However, this architecture exhibits less gain relating to a reduction in fiber installation costs. In particular, the advantage obtained in accordance with use of the PON architecture having a conventional distribution network type is reduced as the PON architecture is similar to a MAN architecture such as a metro Ethernet, a backbone architecture, or a backbone network. Therefore, it is also necessary to develop a system capable of solving this problem.

SUMMARY OF THE INVENTION

The present invention has been made in view of the above mentioned problems, and an object of the invention is to provide a WDM passive optical network (PON) system capable of achieving transmission and reception of forward and backward data at the same wavelength while using inexpensive Fabry-Perot laser diodes (F-P LDs) as respective light sources of a central office and each ONU, so that it can be inexpensively implemented.

Another object of the invention is to provide a single fiber bi-directional WDM PON system a single fiber bi-directional ring type WDM PON system which use the same wavelength for forward and backward optical signals at each channel while having a self-healing function by use of add/drop elements.

Another object of the invention is to provide a bus type WDM PON system capable of using the same wavelength for forward and backward optical signals by use of one WDM element, thereby reducing the multiplexing/demultiplexing costs by half, as compared to conventional WDM systems.

In accordance with the present invention, these objects are accomplished by providing a wavelength division multiplexing passive optical network (WDM PON) system in which an optical signal outputted from a central office is injected into a Fabry-Perot laser diode (F-P LD) as the light source of an optical network unit, so that the output wavelength of the optical network unit is injection-locked at the same wavelength as that of the optical signal outputted from the central office, thereby enabling the optical network unit to output an optical signal having the same wavelength as that of the optical signal outputted from the central office.

In accordance with one aspect, the present invention provides a wavelength division multiplexing passive optical network (WDM PON) system comprising: a central office for generating optical signals of different wavelengths, multiplexing the generated optical signals, and outputting the resultant multiplexed optical signal to an optical communication line, the central office receiving an optical signal having the same wavelengths as those of the generated optical signals, and demultiplexing the received optical signal; a remote node for demultiplexing the optical signal transmitted from the central office via the optical communication line, and outputting the resultant demultiplexed optical signals to distributed optical communication lines, respectively, the remote node multiplexing optical signals respectively transmitted from the distributed optical communication lines, and outputting the resultant multiplexed optical signal to the optical communication line; and a plurality of optical network units for receiving the optical signals transmitted from the remote node via the distributed optical communication lines, respectively, each of the optical network units generating an optical signal having the same wavelength as that of the optical signal received thereto, and transmitting the generated optical signal to the remote node through an associated one of the distributed optical communication lines.

In accordance with another aspect, the present invention provides a ring type wavelength division multiplexing passive optical network (WDM PON) system comprising: a central office including a first multiplexer/demultiplexer adapted to perform a multiplexing/demultiplexing operation for normal signals to be used in a normal state, and a second multiplexer/demultiplexer adapted to perform a multiplexing/demultiplexing operation self-healing signals to be used for a self-healing purpose, the central office generating optical signals of N different wavelengths, each of the first and second multiplexers/demultiplexers multiplexing the generated optical signals, and transmitting the resultant multiplexed optical signal to optical network units through a single optical fiber, while demultiplexing a multiplexed optical signal received from the single optical fiber, thereby detecting data generated from the optical network units; and remote nodes respectively including bi-directional add/drop devices connected to respective optical network units, the remote nodes establishing a ring type distribution network in cooperation with the first and second multiplexers/demultiplexers of the central office, each of the bi-directional add/drop devices including first and second WDM filters respectively having opposite signal travel directions, the first WDM filter performing an add/drop operation for associated ones of the normal signals, the second WDM filter performing an add/drop operation for associated ones of the self-healing signals.

In accordance with another aspect, the present invention provides a bus type wavelength division multiplexing passive optical network (WDM PON) system including a central office, and a remote node connected to the central office via a single optical fiber while being connected to a plurality of optical network units via optical fibers, respectively, wherein the central office generates optical signals of N different wavelengths, multiplexes the generated optical signals through a multiplexer, transmits the resultant multiplexed optical signal to the remote node through the single optical fiber, receives a multiplexed optical signal from the remote node, and demultiplexes the received multiplexed optical signal through a demultiplexer, thereby detecting data generated from the optical network units; and wherein the remote node includes bi-directional add/drop elements connected to respective optical network units, thereby establishing a bus type distribution network, each of the bi-directional add/drop elements drops an optical signal having a selected wavelength from optical signals of N different wavelengths inputted to an input port thereof, to a drop port thereof in accordance with a reflection operation thereof, and transmits the optical signals of the remaining wavelengths through an output port thereof, while reversibly reflecting an optical signal having the selected wavelength inputted to the drop port toward the input port to output the reflected optical signal to the central office.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, the configuration and operation of a WDM PON system according to the present invention will be described in detail with reference to the annexed drawings.

Figure 2:
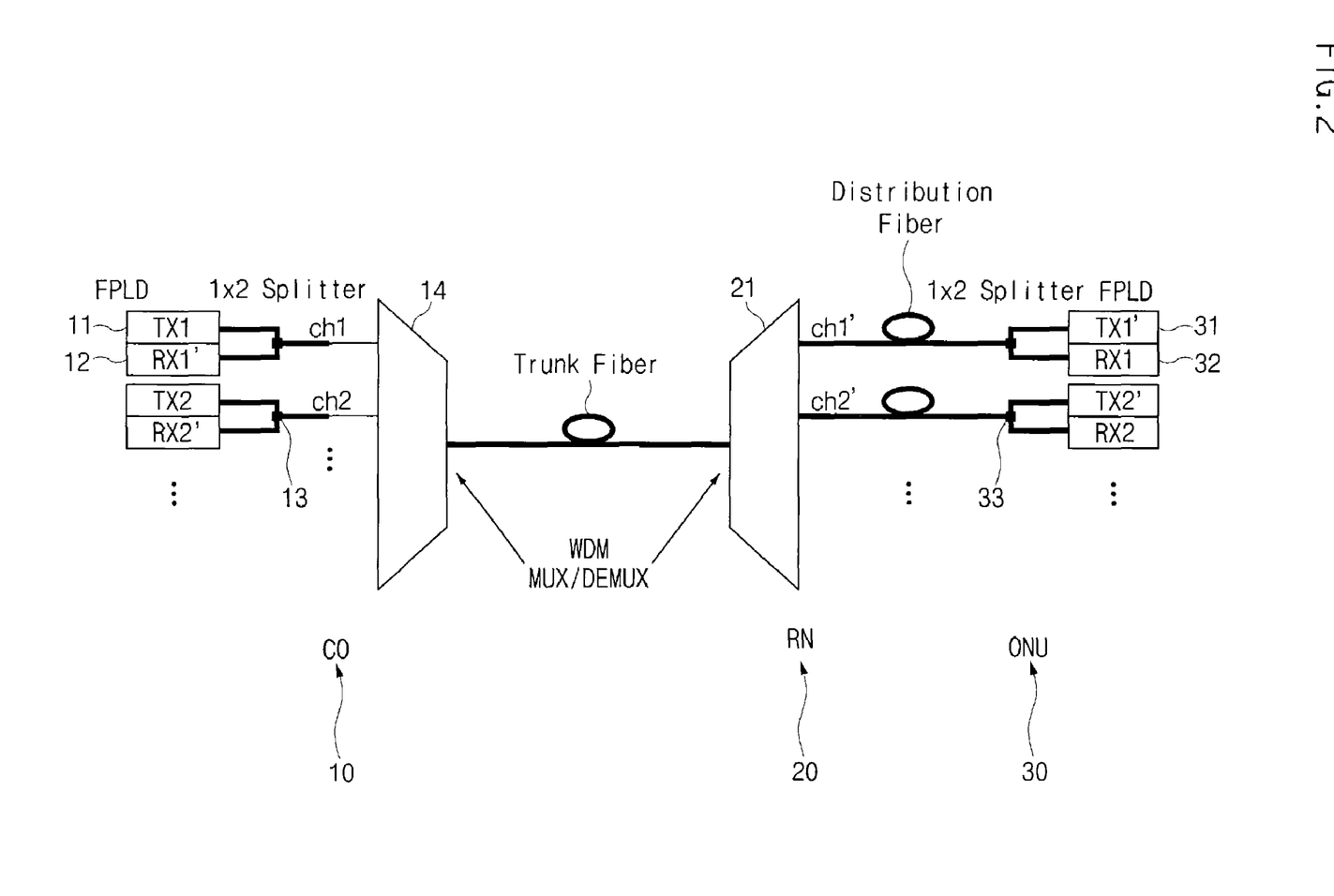
FIG. 2 is a schematic diagram illustrating the configuration of a WDM PON system according to an embodiment of the present invention.

FIG. 2 is a schematic diagram illustrating the configuration of a WDM PON system according to an embodiment of the present invention. The illustrated system configuration is applicable to the case in which forward and backward signals have the same wavelength. As shown in FIG. 2, the system according to the embodiment of the present invention includes a central office (CO) 10, a remote node (RN) 20, and a plurality of optical network units (ONUs) 30. Each ONU 30 is connected to the central office 10 via optical links.

When the central office 10 receives optical signals of different particular wavelengths $\lambda_1, \lambda_2, \ldots \lambda_N$, it multiplexes the received optical signals, and transmits the multiplexed optical signal to the remote node 20. The remote node 20 demultiplexes the multiplexed optical signal received from the central office 10, and outputs the demultiplexed optical signals of different particular wavelengths $\lambda_1, \lambda_2, \ldots \lambda_N$ to respective ONUs 30. The ONUs 30 are configured to receive respective demultiplexed optical signals of different particular wavelengths $\lambda_1, \lambda_2, \ldots \lambda_N$ transmitted from the remote node 20.

On the other hand, when the ONUs 30 transmit respective optical signals of different particular wavelengths $\lambda_1, \lambda_2, \ldots \lambda_N$ to the remote node 20, this remote node 20 multiplexes the optical signals received thereto, and transmits the multiplexed optical signal to the central office 10. The central office 10 demultiplexes the multiplexed optical signal received from the remote node 20, and outputs the demultiplexed optical signals of different particular wavelengths $\lambda_1, \lambda_2, \ldots \lambda_N$.

The central office 10 includes a plurality of first transmitters 11 for outputting optical signals of different particular wavelengths $\lambda_1, \lambda_2, \ldots \lambda_N$, a plurality of first receivers 12 for receiving optical signals respectively having the same wavelengths as those of the optical signals outputted from the first transmitters 11, that is, the wavelengths $\lambda_1, \lambda_2, \ldots \lambda_N$, and a plurality of optical splitters 13 for distributing optical signals, transmitted from the remote node 20, to both the first transmitters 11 and the first receivers 12. The central office 10 also includes a first WDM multiplexer/demultiplexer (MUX/DEMUX) 14 for multiplexing the optical signals of wavelengths $\lambda_1, \lambda_2, \ldots \lambda_N$ respectively received from the first transmitter 11, while demultiplexing a multiplexed optical signal of wavelengths $\lambda_1, \lambda_2, \ldots \lambda_N$ received from the remote node 20.

The remote node 20 includes a second MUX/DEMUX 21. This second MUX/DEMUX 21 receives the multiplexed optical signal of wavelengths $\lambda_1, \lambda_2, \ldots \lambda_N$ from the central office 10, demultiplexes the received optical signal, and then transmits the demultiplexed optical signals of wavelengths $\lambda_1, \lambda_2, \ldots \lambda_N$ to respective ONUs 30. The second MUX/

DEMUX 21 also receives optical signals of wavelengths $\lambda_1$, $\lambda_2$, ... $\lambda_N$ from respective ONUs 30, multiplexes the received optical signals, and then transmits the multiplexed optical signal of wavelengths $\lambda_1$, $\lambda_2$, ... $\lambda_N$ to the central office 10.

Respective ONUs 30 include a plurality of second transmitters 31 for transmitting optical signals having the same wavelengths as those of the optical signals transmitted from the first transmitters 11, that is, wavelengths $\lambda_1$, $\lambda_2$, ... $\lambda_N$ respectively, a plurality of second receivers 32 for receiving optical signals of wavelengths $\lambda_1$, $\lambda_2$, ... $\lambda_N$ transmitted from the remote node 20, and a plurality of second optical splitters 33 for distributing the optical signals of wavelengths $\lambda_1$, $\lambda_2$, ... $\lambda_N$ transmitted from the remote node 20, to both the second transmitters 31 and the second receivers 32.

In order to implement an inexpensive system, inexpensive Fabry-Perot laser diodes (F-P LDS) are used as respective light sources of the transmitters, in place of expensive distributed feedback laser diodes requiring a strict wavelength stability, in accordance with the present invention.

The operation of the WDM PON system according to the illustrated embodiment of the present invention will now be described in conjunction with the case in which F-P LDs are used as respective light sources of the first and second transmitters 11 and 31 respectively included in the central office 10 and each ONU 30.

First, the operation of the WDM PON system associated with a forward signal traveling from the central office 10 to the ONUs 30 will be described. When incoherent light of a narrow band, for example, a wavelength $\lambda_1$, is injected into an F-P LD as the light source of an associated one of the first transmitters 11, the F-P LD, which has a plurality of oscillating modes, oscillates in a mode corresponding to the wavelength of the injected light while suppressing its oscillation in other modes. Accordingly, the output wavelength of the F-P LD is locked at the wavelength of the injected light (this phenomenon is called "injection locking"). In such a manner, the first transmitters 11 of the central office 10 generate optical signals of different particular wavelengths, for example, wavelengths $\lambda_1$, $\lambda_2$, ... $\lambda_N$, in accordance with their particular oscillating modes, respectively, and transmit the generated optical signals to respective first optical splitters 13. The optical signals of wavelengths $\lambda_1$, $\lambda_2$, ... $\lambda_N$ outputted from respective first transmitters 11 are inputted to the first MUX/DEMUX 14 via respective first optical splitters 13. The first MUX/DEMUX 14 multiplexes the optical signals of wavelengths $\lambda_1$, $\lambda_2$, ... $\lambda_N$ and then transmits the multiplexed optical signal of wavelengths $\lambda_1$, $\lambda_2$, ... $\lambda_N$ to the remote node 20.

When the multiplexed optical signal of wavelengths $\lambda_1$, $\lambda_2$, ... $\lambda_N$ is inputted to the remote node 20, the second MUX/DEMUX 21 of the remote node 20 demultiplexes the multiplexed optical signal of wavelengths $\lambda_1$, $\lambda_2$, ... $\lambda_N$, and then the demultiplexed optical signals of wavelengths $\lambda_1$, $\lambda_2$, ... $\lambda_N$ to respective ONUs 30.

When an optical signal of a particular wavelength, for example, a wavelength $\lambda_1$, is inputted to the second optical splitter 33 of an associated ONU 30, the second optical splitter 33 distributes the optical signal of the particular wavelength, that is, the wavelength $\lambda_1$, to both the associated second transmitter 31 and the associated second receiver 32. The second receiver 32 receives the optical signal of the associated particular wavelength, that is, the wavelength $\lambda_1$, transmitted from the associated second optical splitter 33. Meanwhile, when the optical signal of the particular wavelength, that is, the wavelength $\lambda_1$, from the associated second optical splitter 33 is injected into the associated second transmitter 31, the F-P LD included in the second transmitter 31 as a light source is injection-locked at the particular wavelength, that is, the wavelength $\lambda_1$. Accordingly, the output wavelength of the F-P LD is locked at the wavelength of the injected optical signal, that is, at the same wavelength as that of the optical signal received from the central office 10. In such a manner, respective second transmitters 11 of ONUs 30 can transmit optical signals respectively having the same wavelengths as those of the optical signals transmitted from the central office 10.

Next, the operation of the WDM PON system associated with a backward signal traveling from the ONUs 30 to the central office 10 will be described. This operation is carried out in the reverse order to that of the above described operation carried out for a forward signal. Since the F-P LD of the second transmitter 31 included in each ONU 30 is locked at the same wavelength as that of the optical signal received from the central office 10, for example, a wavelength $\lambda_1$, the second transmitter 31 generates an optical signal of the locking wavelength, for that is, the wavelength $\lambda_1$. Thus, the second transmitters 31 of respective ONUs 30 transmit optical signals of different particular wavelengths, for example, wavelengths $\lambda_1$, $\lambda_2$, ... $\lambda_N$ to the remote node 20. Then, the second MUX/DEMUX 21 of the remote node 20 multiplexes the optical signals of wavelengths $\lambda_1$, $\lambda_2$, ... $\lambda_N$, and subsequently transmits the multiplexed optical signal of wavelengths $\lambda_1$, $\lambda_2$, ... $\lambda_N$ to the central office 10.

When the multiplexed optical signal of wavelengths $\lambda_1$, $\lambda_2$, ... $\lambda_N$ is inputted to the central office 10, the first MUX/DEMUX 14 of the central office 10 demultiplexes the multiplexed optical signal of wavelengths $\lambda_1$, $\lambda_2$, ... $\lambda_N$ and then the demultiplexed optical signals of wavelengths $\lambda_1$, $\lambda_2$, ... $\lambda_N$ to respective first splitters 13. When each first splitter 13 receives the optical signal of the associated particular wavelength, for example, a wavelength $\lambda_1$, it distributes the optical signal to both the associated first transmitter 11 and the associated first receiver 12. The first receiver 12 receives the optical signal of the associated particular wavelength, that is, the wavelength $\lambda_1$, transmitted from the associated first optical splitter 13. Meanwhile, when the optical signal of the particular wavelength, that is, the wavelength $\lambda_1$, from the associated first optical splitter 13 is injected into the associated first transmitter 11, the F-P LD included in the first transmitter 11 as a light source is injection-locked at the particular wavelength, that is, the wavelength $\lambda_1$. Accordingly, the output wavelength of the F-P LD is locked at the wavelength of the injected optical signal, that is, at the same wavelength as that of the optical signal transmitted from the associated ONU 30.

Thus, it is possible to use the same wavelength for transmitting and receiving wavelengths of forward and backward channels. For example, both the forward and backward channels use wavelengths $\lambda_1$ to $\lambda_N$. Accordingly, it is unnecessary to install an additional multiplexer/demultiplexer at each of the central office 10 and remote node 20 for bi-directional transmission. For example, although two multiplexers/demultiplexers are used in each of a central office and a remote node in conventional cases in order to transmit forward and backward optical signals respectively having different wavelengths of, for example, $\lambda_1$ to $\lambda_N$ and $\lambda_{N+1}$ to $\lambda_{2N}$, the multiplexer/demultiplexer required for transmission of the optical signals having the wavelengths of $\lambda_{N+1}$ to $\lambda_{2N}$ is dispensed with in accordance with the present invention because both the forward and backward channels use the wavelengths $\lambda_1$ to $\lambda_N$.

In conventional the WDM PON systems, it is also necessary to use separate expensive WDM filters, for example, the WDM filters 130 and 330 in the case of FIG. 1, for splitting of optical signals in the central office 100 and each ONU 300. However, the optical splitters 13 and 33, which are inexpensive, are used in place of the WDM filters, in accordance with the present invention. Accordingly, it is possible to implement an inexpensive WDM PON system.

In the illustrated embodiment of the present invention, 1×2 optical splitters are used for respective first and second optical splitters 13 and 33. In this case, however, optical power loss occurs because of the structural characteristics of each optical splitter for splitting an input optical signal by dividing the optical power of the input optical signal by 2, thereby outputting split optical signals with half-reduced optical power. For example, for forward optical signals, each optical splitter 13 transmits an optical signal outputted from the associated first transmitter 11 to the first MUX/DEMUX 14 in a state of dividing the optical power of the optical signal by 2. As a result, optical power loss of about 3 dB occurs. Similarly, each second optical splitter 33 transmits an optical signal outputted from the remote node 20 to both the associated second transmitter 31 and the associated second receiver 32 in a state of dividing the optical power of the optical signal by 2. As a result, optical power loss of about 3 dB occurs. Thus, total optical power loss of about 6 dB occurs. In WDM PON systems, however, there is no problem caused by such optical power loss of about 6 dB because the distance between the central office and the remote node is typically several km to several ten km.

Since optical signals for transmission and optical signals for reception have the same wavelengths in accordance with this embodiment of the present invention, there may be a problem caused by near-end crosstalk, that is, reflection and re-reception of a transmitted optical signal at a connecting point between an optical fiber and a MUX/DEMUX. For example, there may be a problem in that the reflected transmitted optical signal is processed as a received optical signal. However, this problem caused by the near-end crosstalk can be removed by a method typically used in optical fibers to prevent reflection of optical signals. For example, there may be a method in which an APC (Angled Polished Connector) type connector having a certain inclination at an end thereof is used to adjust the reflection angle of a transmitted optical signal, or a method in which a junction where reflection of a transmitted optical signal may occur is sliced to prevent reflection of the optical signal.

Figure 3:
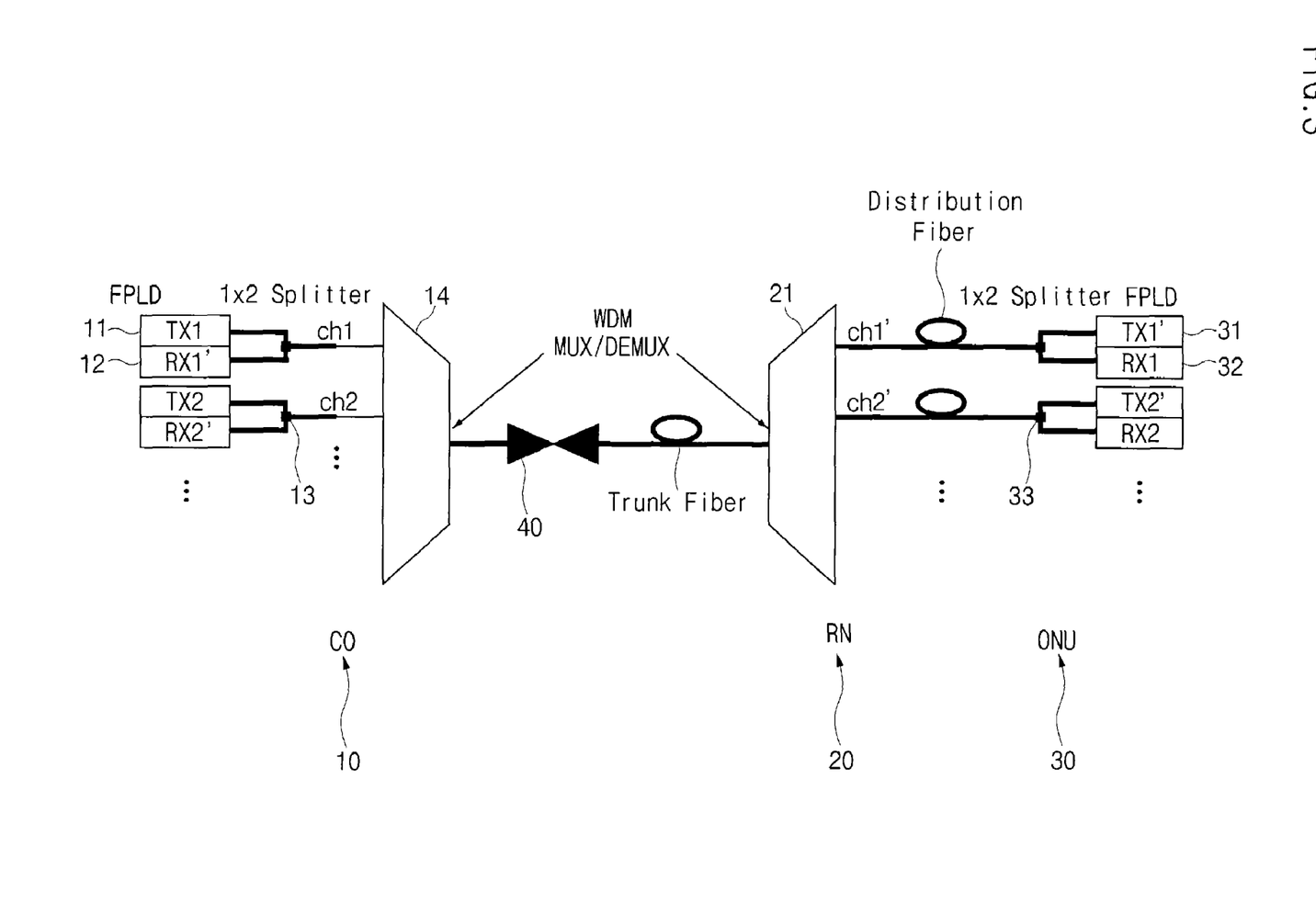
FIG. 3 is a schematic diagram illustrating the configuration of a WDM PON system according to another embodiment of the present invention.

FIG. 3 is a schematic diagram illustrating the configuration of a WDM PON system according to another embodiment of the present invention. The system configuration of this embodiment is identical to that of the embodiment illustrated in FIG. 2, except that a bi-directional optical amplifier 40 is installed on an optical communication line between the central office 10 and the remote node 20 in order to increase the power of multiplexed forward and backward channels, thereby increasing the transmission distance or rate of the forward and backward channels. In FIG. 3, respective constitutive elements corresponding to those of FIG. 2 are designated by the same reference numerals.

As shown in FIG. 3, the bi-directional optical amplifier 40, which may be, for example, an erbium-doped fiber amplifier (EDFA), serves to amplify forward and backward optical signals inputted thereto. In accordance with this amplification, wide-band noise, that is, amplified spontaneous emission (ASE), is generated from the bi-directional optical amplifier 40. Such ASE is handled as noise in conventional WDM PON systems. However, in the system of the present invention, since optical signals emerging from the bi-directional optical amplifier 40 are routed in the unit of wavelengths while passing through the first MUX/DEMUX 14 or second MUX/DEMUX 21, ASE contained in those optical signals is used for injection locking of F-P LDs. Accordingly, it is possible to simply increase the optical power of forward and backward optical signals without using any additional device, as compared to conventional optical amplifiers requiring additional equipment such isolators to achieve an improvement in noise characteristics.

Meanwhile, in the case of a transmission network constructed using a WDM PON system, it is necessary to perform an add/drop function at each node of the transmission network. In order to perform such an add/drop function, an add/drop element is typically used. Such an add/drop element is used in WDM systems to drop an optical signal of a wavelength λm corresponding to a particular channel while adding another optical signal having the same wavelength as that of the dropped optical signal, that is, a wavelength λm', to the particular channel. That is, the add/drop element is widely used in WDM systems for separation and addition of a particular channel.

Figure 4:
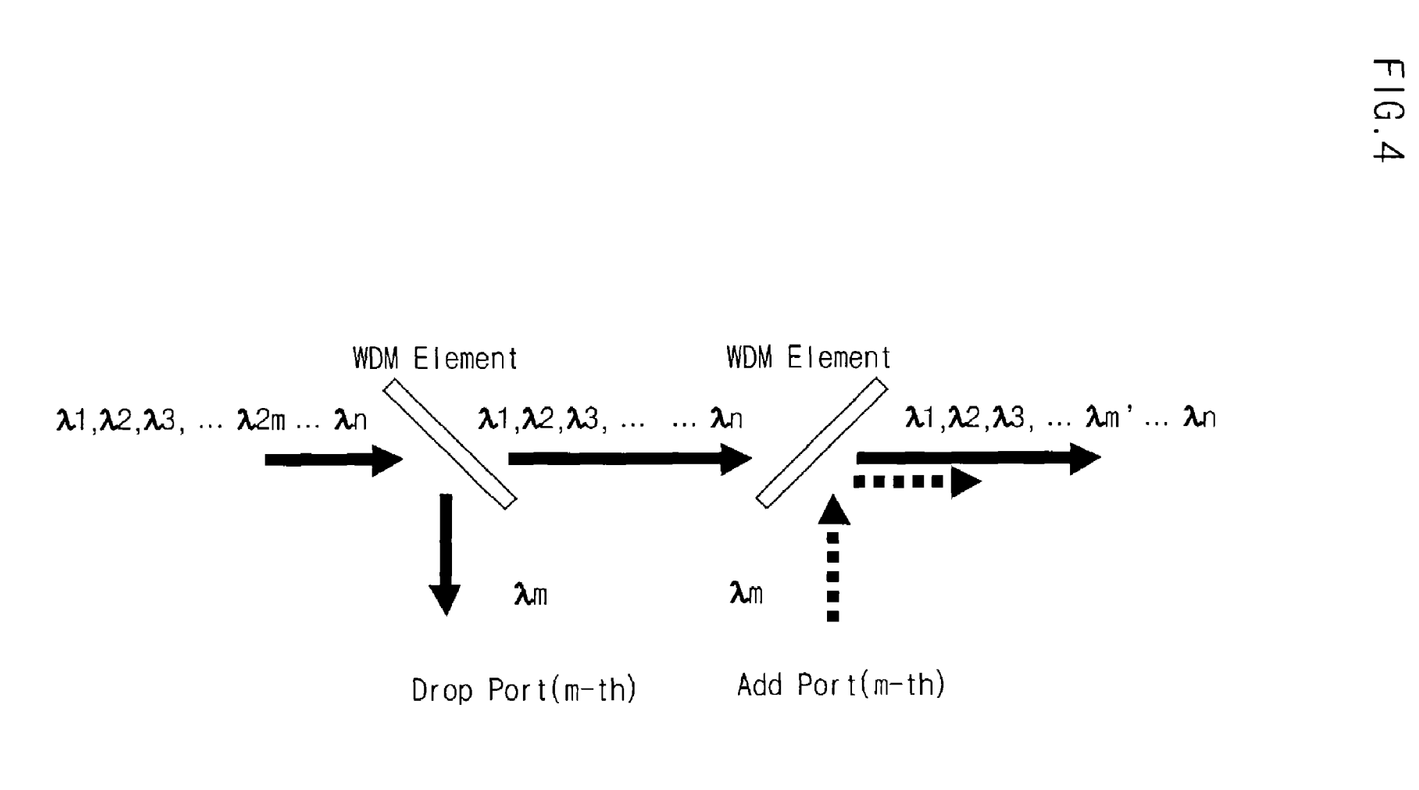
FIG. 4 is a schematic diagram illustrating the basic configuration of a general 4-port add/drop device.

FIG. 4 is a schematic diagram illustrating the basic configuration of a 4-port add/drop device implemented by a conventional WDM thin film filter. This 4-port add/drop device uses two constitutive elements respectively adapted to transmit an optical signal of a particular band and to reflect an optical signal of another particular band. Basically, the 4-port add/drop device has reversible operation characteristics. In conventional WDM systems, the operation principle of the 4-port add/drop device is frequently used to separate an optical signal of a particular wavelength from forward or backward optical signals of different wavelengths traveling through an optical fiber, or to add the optical signal to the forward or backward optical signals (here, the reflected optical signal may be used for transmission whereas the transmitted optical signal for reception). Thus, the above mentioned conventional WDM-PON systems use different channel wavelengths for up and down-links.

Figure 5:
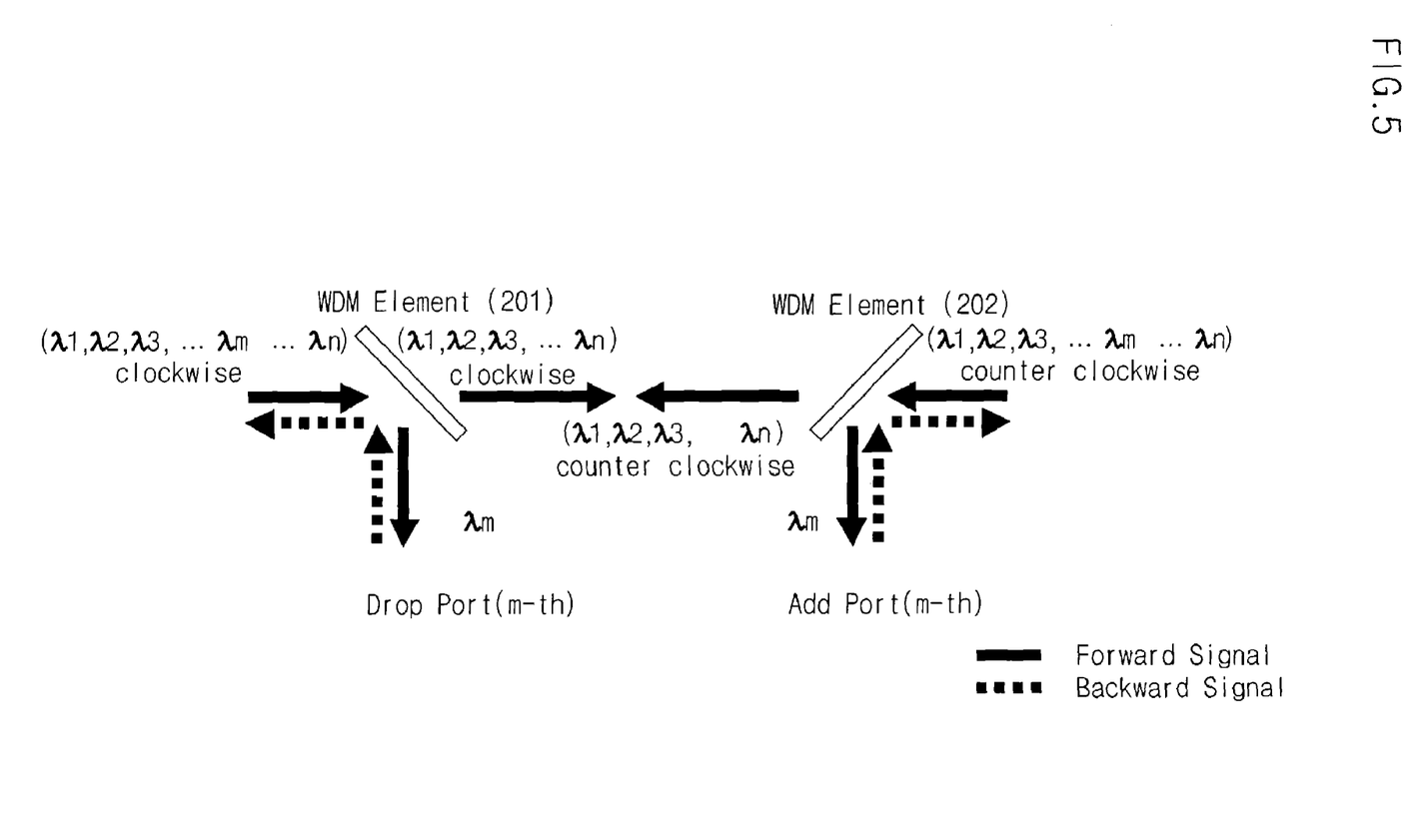
FIG. 5 is a schematic diagram illustrating the configuration of an add/drop device in accordance with an embodiment of the present invention.

FIG. 5 illustrates the configuration of an add/drop device of a new type configured by use of add/drop elements shown in FIG. 4 to perform a self-healing function in a WDM PON system in accordance with the present invention.

Referring to FIG. 5, the add/drop device has a 4-port add/drop device with two WDM thin film filters. However, each WDM thin film filter has a configuration adapted to use the same wavelength for up and down-links of an associated channel. That is, both the up and down-linking operations of each channel can be achieved using only one WDM filter because the same wavelength is used for both the up and down-links of the channel. In conventional cases, two WDM filters should be used because different wavelengths are used for up and down-links at an associated channel, respectively. For the same function, however, only one WDM filter is used, so that it is possible to reduce the costs by half, as compared to the conventional WDM systems.

In accordance with the present invention, two WDM filters 201 and 202 having the same function are used, as shown in FIG. 5. One WDM filter, that is, the WDM filter 201, is used for a clockwise channel to be normally used, whereas the other WDM filter, that is, the WDM filter 202 is used for a counter-clockwise channel to be used for a self-healing purpose. The traveling direction of optical signals in the WDM filter 201 for a normal purpose is opposite to that of optical signals in the WDM filter 202 for a self-healing purpose.

That is, the add/drop elements of the present invention are defined for clockwise and counter-clockwise channels in accordance with the traveling direction of WDM channel signals, respectively. If the add/drop element for a clockwise channel is normally used, then the add/drop element for a counter-clockwise channel is used for a self-healing function to be carried out when fiber switching occurs due to disaster or other accidents. While one of the add/drop elements operates, the other add/drop element does not operate. Since each add/drop element of the present invention applies the same wavelength to both the forward and backward channels, it is possible to perform separation and addition functions at respective drop and add ports for both the forward and backward signals, as compared to conventional cases. That is, the add/drop element uses the same wavelength for both the forward and backward optical signals, and serves to drop and add forward and backward optical signals of a particular wavelength with respect to transmitting and receiving modules through a single optical fiber and a 1×2 splitter.

In the WDM filter 201, WDM channel signals travel in a clockwise direction. This WDM filter 201 selectively drops an optical signal having a particular wavelength λm from optical signals of different wavelengths inputted to its first input port, to its drop port in accordance with a reflection operation thereof, while transmitting the optical signals of the remaining wavelengths. Reversibly, the WDM filter 201 reflects an optical signal having the particular wavelength λm inputted to its drop port toward its first input port. That is, the WDM filter 201 uses the same wavelength for transmission and reception of optical signals at a particular channel.

In the WDM filter 202, WDM channel signals travel in a counter-clockwise direction. Similarly to the WDM filter 201, the WDM filter 202 uses the same wavelength for transmission and reception of optical signals at the particular channel. That is, the WDM filter 202 selectively drops an optical signal having a particular wavelength λm from optical signals of different wavelengths inputted to its second input port, to its add port in accordance with a reflection operation thereof, while transmitting the optical signals of the remaining wavelengths. Reversibly, the WDM filter 201 reflects an optical signal having the particular wavelength λm inputted to its add port toward its second input port.

Thus, the 4-port add/drop device of the present invention includes two WDM filters, one of which, that is, the WDM filter 201, is used for a normal purpose, with the other WDM filter, that is, the WDM filter 202, being used as a redundancy element for a self-healing purpose.

Since the system according to this embodiment of the present invention has a self-healing function while implementing a single fiber ring network, as described above, it is possible to reduce the fiber construction costs by half, as compared to conventional ring systems. It is also possible to reduce the costs required to construct the WDM filters by half, as compared to the costs required to construct a conventional WDM architecture, because the same wavelength is used for up and down-links of each channel.

Figure 6:
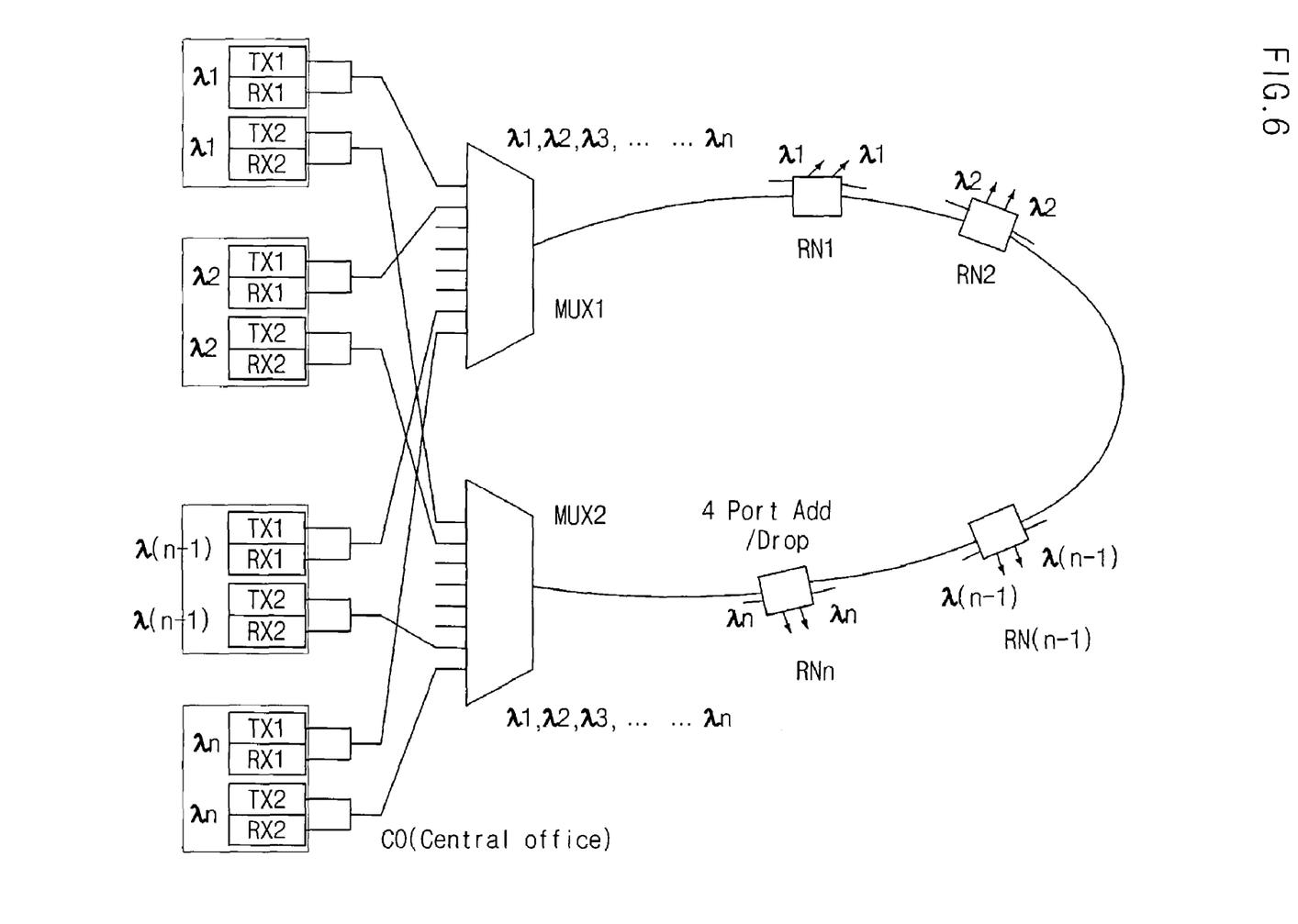
FIG. 6 is a schematic diagram illustrating the configuration of a bi-directional single fiber ring type WDM PON system according to the present invention in which the add/drop device of FIG. 5 is used.

FIG. 6 illustrates the architecture of a bi-directional single fiber ring type WDM PON system according to the present invention in which the add/drop device of FIG. 5 is used. As shown in FIG. 6, this system includes a central office CO for generating optical signals of N different wavelengths, multiplexing the optical signals through a mulitplexer, and transmitting the resultant multiplexed optical signal to N remote nodes RN1 to RNn via a single optical fiber, respectively. The central office CO also receives a multiplexed optical signal of different wavelengths from respective remote nodes RN1 to RNn, demultiplexing the received optical signal through a demultiplexer, and detecting data of respective ONUs from the resultant demultiplexed optical signals. The system also includes the remote nodes RN1 to RNn as its constitutive element. The remote nodes RN are connected to the central office CO through a single optical fiber while being connected to a plurality of ONUs through optical fibers, respectively.

The central office CO includes a plurality of 1×2 couplers (or splitters) respectively corresponding to the N different wavelengths, and two WDM multiplexers/demultiplexers, that is, first and second WDM multiplexers/demultiplexers MUX1 and MUX2. The first multiplexer/demultiplexer MUX1 is used for a normal purpose, whereas the second mulitplexer/demultiplexer MUX2 is used for a self-healing purpose. That is, the first multiplexer/demultiplexer MUX1 multiplexes a plurality of optical signals with different wavelengths, and transmits the resultant multiplexed optical signal to one of the WDM filters included in each add/drop device used in each remote node RN, that is, the WDM filter 201. The first multiplexer/demultiplexer MUX1 also receives an optical signal of a particular wavelength reflected from the WDM filter 201. Similarly, the second multiplexer/demultiplexer MUX2 multiplexes a plurality of optical signals with different wavelengths, and transmits the resultant multiplexed optical signal to the other WDM filter included in each add/drop device of each remote node RN, that is, the WDM filter 202. The second multiplexer/demultiplexer MUX2 also receives an optical signal of a particular wavelength reflected from the WDM filter 202.

Each remote node RN is connected between the central office CO and an associated one of ONUs. The remote node RN uses a passive optical element for performing WDM multiplexing/demultiplexing operations to demultiplex a multiplexed optical signal of different wavelengths outputted from the central office CO so as to transmit the resultant demultiplexed optical signals to respective ONUs in accordance with the wavelengths, while multiplexing WDM channels of different wavelengths outputted from respective ONUs so as to transmit the resultant multiplexed optical signal to the central office CO.

The number of remote nodes corresponds to the number of subscribers. These remote nodes RN1 to RNn construct a bi-directional ring type distribution network. Each remote node RN is equipped with an add/drop device having a configuration as shown in FIG. 5.

Each remote node RN is assigned a particular wavelength different from those of other remote nodes. The remote node RN drops an optical signal with the assigned wavelength from an optical signal with a plurality of wavelengths inputted thereto, and then transmits the dropped optical signal to the associated ONU. The remote node RN also passes the optical signal with the remaining wavelengths. That is, each remote node communicates with the central office, using only an optical signal with the wavelength assigned thereto.

In the fiber ring shown in FIG. 6, the signal transmission direction thereof corresponds to a clockwise direction or a counter-clockwise direction.

In a normal state, the WDM filter 201 of each add drop device operates to transmit an optical signal in a clockwise direction. On the other hand, in a self-healing state, the WDM filter 202 of each add/drop device operates to transmit an optical signal in a counter-clockwise direction. Thus, it is possible to implement a single fiber bi-directional WDM PON system having a self-healing function.

Basically, in accordance with the present invention, channels having a normal operation function, that is, clockwise channels, are normally used, whereas channels having a self-healing function for the system switched due to disaster or other accidents are maintained in a redundant state.

In a down-linking operation for operations in a normal state, optical signals of different channels are coupled to respective optical fibers via respective 1×2 couplers in the central office CO, and then transmitted to a transmission fiber via the first WDM multiplexer/demultiplexer MUX1, in the form of a multiplexed optical signal.

When the multiplexed optical signal traveling through the transmission fiber passes through the add/drop device of each remote node RN, the optical signal with a channel associated with the remote node RN is reflected from the WDM filter 201 of the add/drop device, so that it is dropped. This dropped optical signal is inputted to a receiving terminal of the associated subscriber (or ONU) via a 1×2 coupler, for example, a 3 dB coupler. Thus, transmission of an optical signal to the associated subscriber is achieved.

On the other hand, in an up-linking operation, an optical signal transmitted from each channel (subscriber or ONU) is coupled to the WDM filter 201 of the add/drop device equipped in the associated remote node RN through the associated 1×2 coupler, and then added to an optical signal traveling through the transmission fiber. The resultant optical signal is then transmitted to the central office CO via the transmission fiber. The transmitted optical signal is reversibly split into optical signals of different channels associated with respective subscribers or ONUs through the first WDM multiplexer/demultiplexer MUX1. The optical signal of each channel is then linked to an associated receiving terminal of the central office CO through the associated 1×2 coupler. That is, the central office CO demultiplexes a multiplexed optical signal so as to detect data in the unit of channels.

Meanwhile, the down and up-linking operations using redundancy channels in a system-switched state are carried out in the same manner as the above described procedure. Of course, in this case, optical signals travel in the opposite direction to that of the normal state. Also, the second WDM multiplexer/demultiplexer MUX2 of the central office CO and the WDM filter 202 of the add/drop device equipped in each remote node RN are used.

Basically, each node requires two transmitter/receiver (Tx/Rx) modules for each channel wavelengths.

Such a network architecture has logical bus type topologies for clockwise and counter-clockwise channels, respectively. Accordingly, this architecture is a basic architecture of Ethernet, so that it is applicable to an Ethernet system. That is, an Ethernet system can be implemented by using the two bus type topologies in an Ethernet.

Accordingly, the ring type WDM PON system according to this embodiment of the present invention can effectively reduce the fiber installation costs where the distance between subscribers is long.

Although conventional single fiber bi-directional WDM PON systems use different wavelengths for forward and backward channels, respectively, so that they require separate multiplexers/demultiplexers for the forward and backward channels, respectively, the WDM PON system according to this embodiment of the present invention uses the same wavelength for forward and backward channels. Accordingly, the multiplexer/demultiplexer of the central office can be reversibly used for both the forward and backward channels, so that it is possible to considerably reduce the system construction costs. Although the central office use two multiplexers/demultiplexers in accordance with the present invention, they are adapted for normal and self-healing functions, respectively. For example, where only the normal function is required, only one multiplexer/demultiplexer may be used in accordance with the present invention, as compared to conventional cases in which two multiplexers/demultiplexers should be used for forward and backward channels, respectively.

For example, in conventional single fiber bi-directional WDM PON systems using WDM filters, two WDM filters should be used to implement a multiplexer/demultiplexer for detection of optical signals at each receiving node (subscriber site). In accordance with the present invention, however, it is possible to implement a mulitplexer/demultiplexer using only one WDM element because the same wavelength is used for both the forward and backward channels. Accordingly, it is possible to reduce the multiplexing/demultiplexing costs by half, as compared to conventional WDM systems.

Also, the add/drop device equipped in each remote node can be used not only for the forward and backward channels, but also for both the channels of a normal purpose and the channels of a self-healing purpose. Accordingly, the system construction costs can be considerably reduced.

Thus, it is possible to implement a WDM PON system using more expensive modules while having a high stability in accordance with the present invention.

Figure 7:
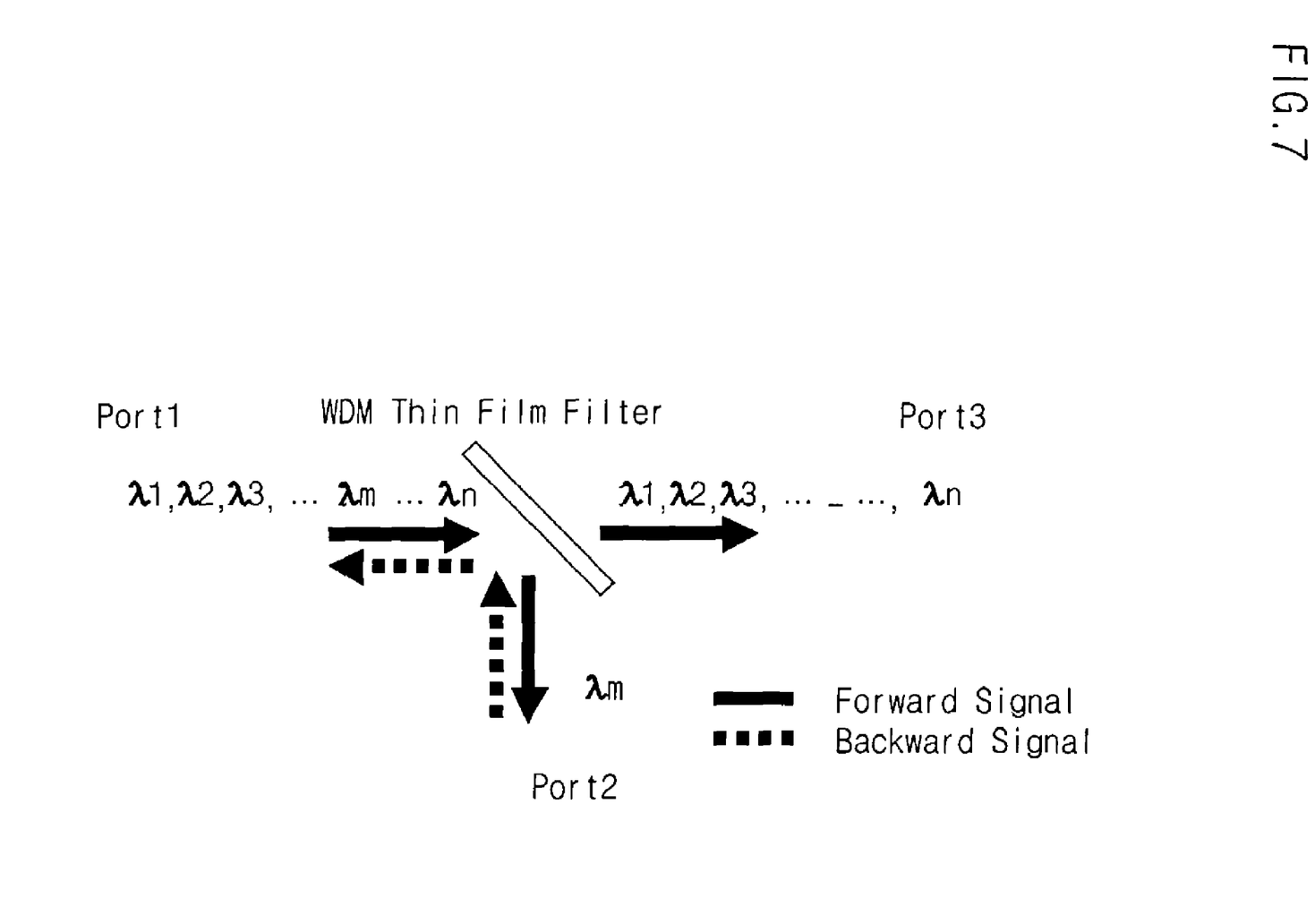
FIG. 7 is a schematic diagram illustrating the configuration of a 3-port add/drop device in accordance with another embodiment of the present invention.

FIG. 7 illustrates the configuration of a 3-port add/drop device in accordance with another embodiment of the present invention. This add/drop device is implemented using a single WDM thin film filter. This WDM thin film filter is configured to receive an optical signal having a plurality of different wavelengths at its first port Port 1, to reflect a wavelength component of the received optical signal corresponding to the characteristics of the filter toward its second port Port 2, and to transmit the remaining wavelength components of the received optical signal to its third port Port 3. The WDM thin film filter also reflects an optical signal having the wavelength corresponding to the characteristics of the filter, inputted to its drop port (Port 2), toward its input port (Port 1).

That is, the single WDM thin film filter shown in FIG. 7, which implements an add/drop device, selectively drops an optical signal of a particular wavelength $\lambda m$, inputted to its first port Port 1, to its drop port (Port 2) in accordance with a reflection operation thereof, while transmitting optical signals of other wavelengths. Reversibly, the WDM thin film filter reflects an optical signal of the particular wavelength $\lambda m$, inputted to its drop port (Port 2), toward its input port (Port 1).

Thus, the add/drop device according to this embodiment of the present invention reduces the construction costs by half, as compared to conventional cases, because it uses only one WDM thin film filter.

Referring to FIG. 7, it can be seen that dropped and added optical signals travel in opposite directions, respectively, as compared to conventional cases in which dropped and added optical signals of a particular channel travel in the same direction through an add/drop device.

Figure 8:
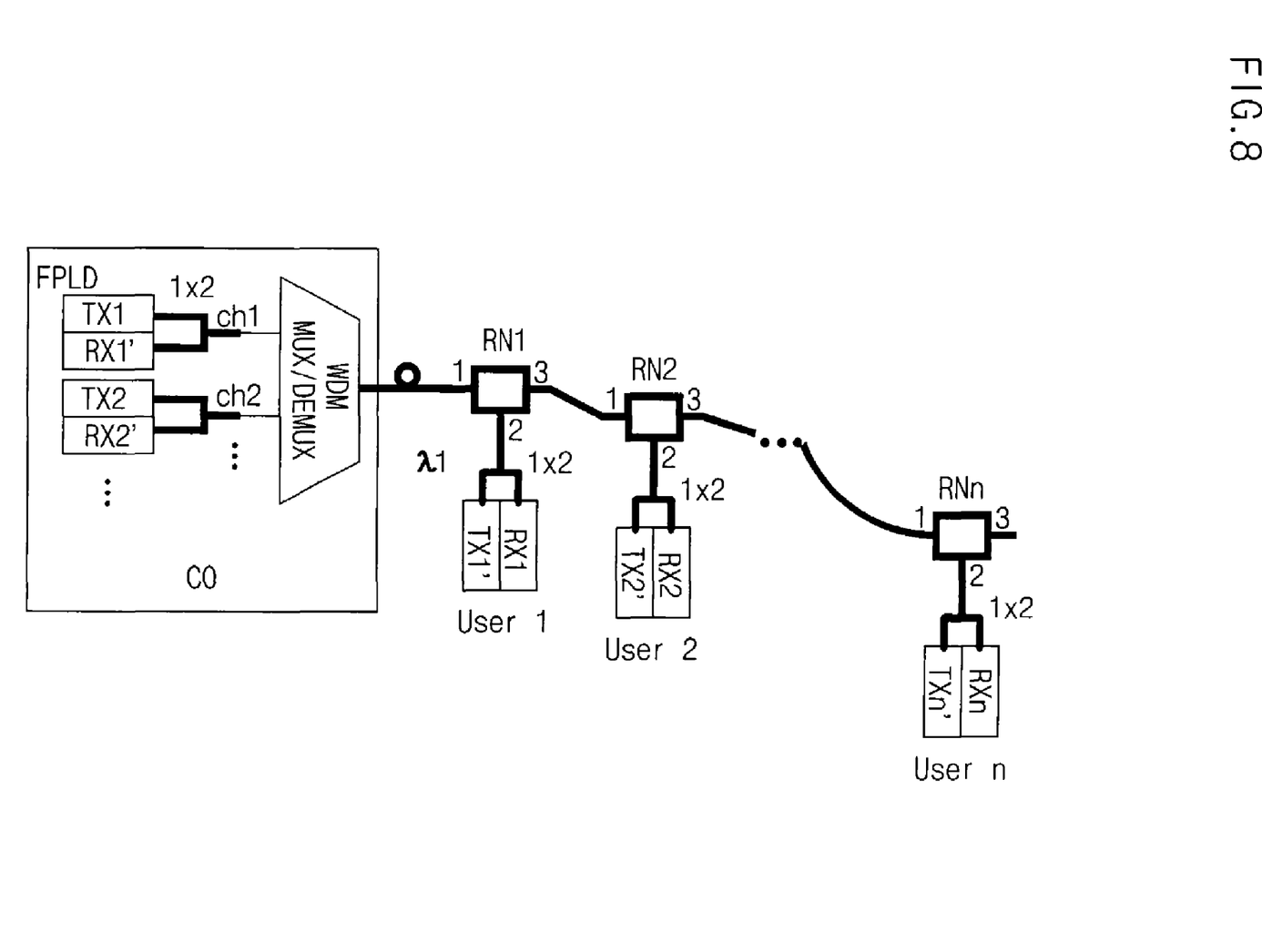
FIG. 8 is a schematic diagram illustrating the configuration of a bus type WDM PON system using the 3-port add/drop device of FIG. 7 in accordance with the present invention.

FIG. 8 illustrates the configuration of a bus type WDM PON system using the 3-port add/drop device of FIG. 7 in accordance with the present invention.

As shown in FIG. 8, the system includes a central office CO which includes 1×2 couplers (or splitters), and a WDM multiplexer/demultiplexer (MUX/DEMUX). The central office CO generates optical signals of different wavelengths, multiplexes the optical signals, and transmits the resultant multiplexed optical signal through a single optical fiber. The central office CO also demultiplexes a multiplexed optical signal inputted thereto, thereby detecting data transmitted from respective remote nodes RN1 to RNn or respective subscribers.

The add/drop device shown in FIG. 7 is equipped in each remote node RN. The add/drop device drops an optical signal having a wavelength corresponding to a particular subscriber, and transmits the dropped optical signal to the particular subscriber. The add/drop device also adds an optical signal transmitted from the particular subscriber, and reflects the resultant optical signal to its input port so as to transmit the optical signal to the central office CO. In this case, the same wavelength is used for both forward and backward channels.

In a down-linking operation, optical signals of different channels are coupled to respective single optical fibers via respective 1×2 couplers in the central office CO, and then transmitted to a transmission fiber via the WDM MUX/DEMUX, in the form of a multiplexed optical signal.

When the multiplexed optical signal traveling through the transmission fiber passes through the 3-port add/drop device of each remote node RN, the optical signal with a channel associated with the remote node RN is dropped. This dropped optical signal is inputted to a receiving terminal of the associated subscriber (or ONU) via a 1×2 coupler, for example, a 3 dB coupler. Thus, transmission of an optical signal to the associated subscriber is achieved.

On the other hand, in an up-linking operation, an optical signal transmitted from each channel (subscriber or ONU) is coupled to the 3-port add/drop device equipped in the associated remote node RN through the associated 1×2 coupler, and then added to an optical signal traveling through the transmission fiber. The resultant optical signal is then transmitted to the central office CO via the transmission fiber. The transmitted optical signal is reversibly split into optical signals of different channels associated with respective subscribers or ONUs through the WDM MUX/DEMUX. The optical signal of each channel is then linked to an associated receiving terminal of the central office CO through the associated 1×2 coupler. That is, the central office CO demultiplexes a multiplexed optical signal so as to detect data in the unit of channels.

Accordingly, the bus type WDM PON system according to this embodiment of the present invention can effectively reduce the fiber installation costs where the distance between subscribers is long.

Although conventional single fiber bi-directional WDM PON systems use different wavelengths for forward and backward channels, respectively, so that they require separate multiplexers/demultiplexers for the forward and backward channels, respectively, the WDM PON system according to this embodiment of the present invention uses the same wavelength for forward and backward channels. Accordingly, the multiplexer/demultiplexer of the central office can be reversibly used for both the forward and backward channels, so that it is possible to considerably reduce the system construction costs.

Also, in conventional single fiber bi-directional WDM PON systems using WDM filters, two WDM filters should be used to implement a multiplexer/demultiplexer for detection of optical signals at each receiving node (subscriber site). In accordance with the present invention, however, it is possible to implement a mulitplexer/demultiplexer using only one WDM element because the same wavelength is used for both the forward and backward channels. Accordingly, it is possible to reduce the multiplexing/demultiplexing costs by half, as compared to conventional WDM systems.

Thus, it is possible to implement a WDM PON system using more expensive modules while having a high stability in accordance with the present invention.

As apparent from the above description, in accordance with the present invention, it is possible to achieve transmission and reception of data on each channel at the same wavelength. Accordingly, there is an advantage in that it is possible to efficiently and economically implement a WDM PON system, as compared to conventional PON systems in which separate multiplexers and separate demultiplexers should be used for forward and backward optical signals, respectively, because the forward and backward optical signals have different wavelengths for each channel.

Also, inexpensive Fabry-Perot laser diodes (F-P LDs) are used as respective light sources of a central office and each ONU in accordance with the present invention, so that the system construction costs can be considerably reduced, as compared to conventional optical networks using expensive laser diodes as light sources.

In accordance with the present invention, a single fiber bi-directional ring architecture having a self-healing function is implemented using add/drop devices each using the same wavelength for forward and backward optical signals at an associated channel, and without using any complex optical elements. Accordingly, it is possible to implement a self-healing function at each node without using any active equipment. As a result, it is possible to obtain characteristics expected when using a PON architecture, that is, effects of easy maintenance and repair, and reduced implementation costs.

Since the same wavelength is used for forward and backward optical signals at each WDM channel, it is possible to reversibly use WDM-based elements. Accordingly, a considerable reduction in system implementation costs is achieved, as compared to conventional systems.

Also, it is possible to reduce the fiber installation costs, and to implement an inexpensive metro system and FTTH (Fiber-To-The-Home) by using a ring architecture in a metro Ethernet area where subscribers are widely distributed without being concentrated.

In addition, the same wavelength is used for forward and backward optical signals at each channel, by use of a 3-port add/drop device, in accordance with the present invention. Accordingly, the multiplexing/demultiplexing costs required in the central office is reduced by half because a single multiplexer/demultiplexer can be used for both the forward and backward optical signals. Where a bus type WDM PON system is implemented using the 3-port add/drop device for each channel in accordance with the present invention, it is possible to more efficiently reduce the fiber installation costs in an area where subscribers are widely distributed.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A wavelength division multiplexing passive optical network (WDM PON) system comprising:
   a central office for generating optical signals of different wavelengths, multiplexing the generated optical signals, and outputting the resultant multiplexed optical signal to an optical communication line, the central office receiving an optical signal having the same wavelengths as those of the generated optical signals, and demultiplexing the received optical signal;

a remote node for demultiplexing the optical signal transmitted from the central office via the optical communication line, and outputting the resultant demultiplexed optical signals to distributed optical communication lines, respectively, the remote node multiplexing optical signals respectively transmitted from the distributed optical communication lines, and outputting the resultant multiplexed optical signal to the optical communication line; and a plurality of optical network units for receiving the optical signals transmitted from the remote node via the distributed optical communication lines, respectively, each of the optical network units generating an optical signal having the same wavelength as that of the optical signal received thereto, and transmitting the generated optical signal to the remote node through an associated one of the distributed optical communication lines, wherein the central office comprises:

a plurality of first transmitters for generating and outputting optical signals of different wavelengths, respectively;

a plurality of first receivers for receiving optical signals having the same wavelengths as those of the optical signals outputted from the first transmitters, respectively;

a first multiplexer/demultiplexer for multiplexing the optical signals respectively outputted from the first transmitters, and outputting the resultant multiplexed optical signal, the first multiplexer/demultiplexer demultiplexing the multiplexed optical signal transmitted from the remote node, and outputting the resultant demultiplexed optical signals; and a plurality of first optical splitters for distributing the demultiplexed optical signals outputted from the first multiplexer/demultiplexer to respective first transmitters and respective second transmitters, wherein each of the first transmitters is injection-locked by the optical signal distributed by an associated one of the first optical splitters.

2. The WDM PON system according to claim 1, wherein the optical signals outputted from the first transmitters have the same wavelengths as those of the optical signals transmitted from the remote node, respectively.

3. The WDM PON system according to claim 1, wherein the remote node comprises:

a second multiplexer/demultiplexer for demultiplexing the multiplexed optical signal transmitted from the central office, and transmitting the resultant demultiplexed optical signals to the optical network units, respectively, the second multiplexer/demultiplexer multiplexing the optical signals respectively transmitted from the optical network units, and transmitting the resultant multiplexed optical signal to the central office.

4. The WDM PON system according to claim 1, further comprising:

a bi-directional optical amplifier installed on the optical communication line.

5. A wavelength division multiplexing passive optical network (WDM PON) system comprising:

a central office for generating optical signals of different wavelengths, multiplexing the generated optical signals, and outputting the resultant multiplexed optical signal to an optical communication line, the central office receiving an optical signal having the same wavelengths as those of the generated optical signals, and demultiplexing the received optical signal;

a remote node for demultiplexing the optical signal transmitted from the central office via the optical communication line, and outputting the resultant demultiplexed optical signals to distributed optical communication lines, respectively, the remote node multiplexing optical signals respectively transmitted from the distributed optical communication lines, and outputting the resultant multiplexed optical signal to the optical communication line; and a plurality of optical network units for receiving the optical signals transmitted from the remote node via the distributed optical communication lines, respectively, each of the optical network units generating an optical signal having the same wavelength as that of the optical signal received thereto, and transmitting the generated optical signal to the remote node through an associated one of the distributed optical communication lines, wherein each of the optical network units comprises:

a second transmitter for generating and outputting an optical signal having the same wavelength as that of an associated one of the demultiplexed optical signals outputted from the remote node;

a second receiver for receiving the associated optical signal outputted from the remote node; and a second optical splitter for distributing the associated optical signal outputted from the remote node to the second transmitter and the second receiver; and wherein the second transmitter is injection-locked by the associated optical signal distributed by the second optical splitter.

6. The WDM PON system according to claim 5, wherein the optical signal outputted from the second transmitter has the same wavelength as that of an associated one of the optical signals generated from the central office.

7. The WDM PON system according to claim 5, wherein the remote node comprises:

a second multiplexer/demultiplexer for demultiplexing the multiplexed optical signal transmitted from the central office, and transmitting the resultant demultiplexed optical signals to the optical network units, respectively, the second multiplexer/demultiplexer multiplexing the optical signals respectively transmitted from the optical network units, and transmitting the resultant multiplexed optical signal to the central office.

8. The WDM PON system according to claim 5, further comprising:

a bi-directional optical amplifier installed on the optical communication line.

* * * * *